United States Patent [19]

Wang

[11] Patent Number: 5,553,757

[45] Date of Patent: Sep. 10, 1996

[54] CREAM DISPENSER HEAD

[76] Inventor: Ming-Teh Wang, 6F, No. 31, Lane 131, Sec.2, Chung Shan Rd., Chung Ho City, Taipei Hsien, Taiwan

[21] Appl. No.: 403,949

[22] Filed: Mar. 14, 1995

[51] Int. Cl.⁶ ..................................................... G01F 11/02
[52] U.S. Cl. ........................ 222/321.9; 222/341; 222/385
[58] Field of Search ............................. 222/321.7, 321.8, 222/321.9, 341, 385

[56] References Cited

U.S. PATENT DOCUMENTS

| | | | |
|---|---|---|---|
| 3,724,726 | 4/1973 | Susuki et al. | 222/385 X |
| 3,796,375 | 3/1974 | Boris | 222/321.7 X |
| 4,693,675 | 9/1987 | Venus, Jr. | 222/321.7 X |
| 5,002,207 | 3/1991 | Giuffredi | 222/385 X |
| 5,271,532 | 12/1993 | Jumel et al. | 222/321.9 |
| 5,405,057 | 4/1995 | Moore | 222/321.9 X |
| 5,447,258 | 9/1995 | Suzuki | 222/341 X |

Primary Examiner—Joseph Kaufman
Attorney, Agent, or Firm—Morton J. Rosenberg; David I. Klein

[57] ABSTRACT

A cream dispenser head includes an accumulator shell having a dip tube at its bottom, a cap, a one-piece sleeve, and a piston inserted through the sleeve driven to pump cream out of the cream dispenser. The sleeve has a bottom end fitted through a center tube of the cap and disposed within the accumulator shell. The sleeve includes an outside flange around its periphery, adjacent the bottom end, defining an upper annular groove and a lower annular groove, sealingly engaging the inner surface of the accumulator shell. The sleeve includes an outward annular flange stopped against the cap center tube. The piston has a tubular piston body and a spring holder fixedly connected to one end of the tubular piston body, stopped against a spring inside the accumulator chamber. The piston includes a plurality of projecting portions stopped against the inside wall of the accumulator shell and a radial through-hole at one end, adjacent to the spring holder. Two mounting flanges, located on the outer surface of the piston, on an end distal to the spring holder, couple a saddle head. The spring holder and the outside flange of the piston define a gap for guiding the cream from an accumulator chamber, through the radial through-hole and into the tubular piston body.

1 Claim, 5 Drawing Sheets 5,553,757

CREAM DISPENSER HEAD

BACKGROUND OF THE INVENTION

The present invention relates to cream dispensers and, more particularly, to a dispenser head which is easy to install and inexpensive to manufacture.

The piston of the dispenser head of a regular cream dispenser, as shown in FIG. 1, is generally comprised of three parts, namely the push tube 10a, the sleeve 20a, and the ring 30a. The ring 30a is mounted around the push tube 10a. The sleeve 20a is sleeved onto one end of the push tube 10a. Because the push tube 10a, the sleeve 20a and the ring 30a are separately molded and then fastened together, the assembly process of the dispenser head is complicated and its manufacturing cost is high. Furthermore, when the dispenser head is operated, the ring 30a may be displaced, causing the inlet 11a of the push tube 10a to be blocked.

SUMMARY OF THE INVENTION

It is, therefore, a primary object of the present invention to provide a cream dispenser which is easy to assemble and inexpensive to manufacture. It is another object of the present invention to provide a cream dispenser which forces the cream to move in course when depressed and which prevents the occurrence of a blockage.

In accordance with this invention, a cream dispenser head comprises an accumulator having a dip tube at the bottom, a sleeve having a top end connected to a saddle head and a bottom end fitted into a hole on the accumulator, and a piston inserted through the sleeve and driven to pump cream out the cream dispenser. The piston includes a tubular piston body and a spring holder fixedly connected to one end of the tubular piston body and stopped against a spring inside the accumulator chamber. The piston has a plurality of projecting portions stopped against the inner surface of the shell of the dispenser head. The tubular piston body includes a radial through hole at one end, adjacent to the spring holder and two mounting flanges at an opposite end outside the sleeve for coupling a saddle head. The sleeve has an outside flange around the periphery at one end defining an upper annular groove and a lower annular groove separated from the upper annular groove. The junction of the spring holder and the outside flange of the piston defines a gap for guiding the cream from an accumulator chamber, into the tubular piston body and through the radial through hole.

DETAILED DESCRIPTION OF THE PREFERRED EMBODIMENT

Figure 1:
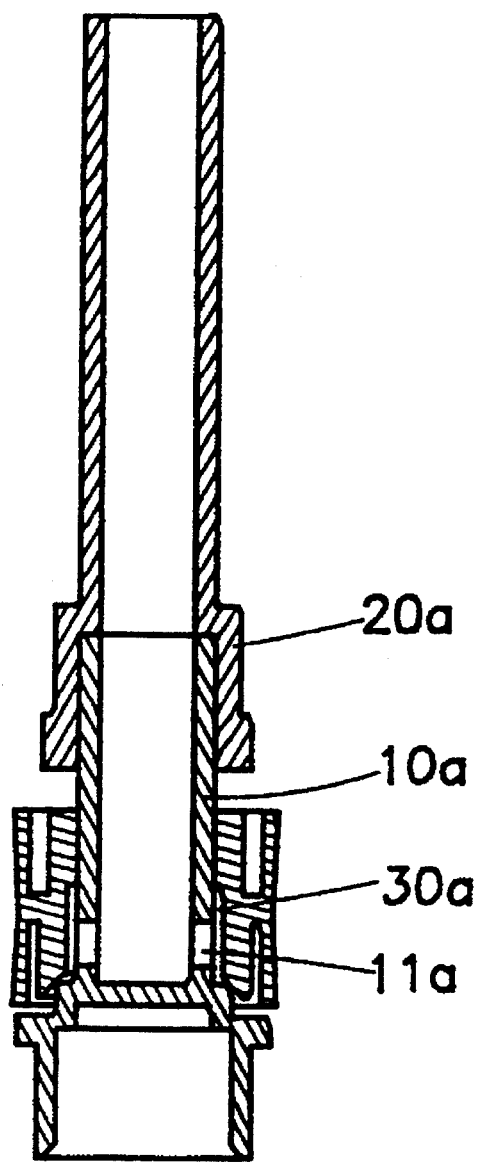
FIG. 1 is a longitudinal view in section of a cream dispenser head according to the prior art.
Figure 2:
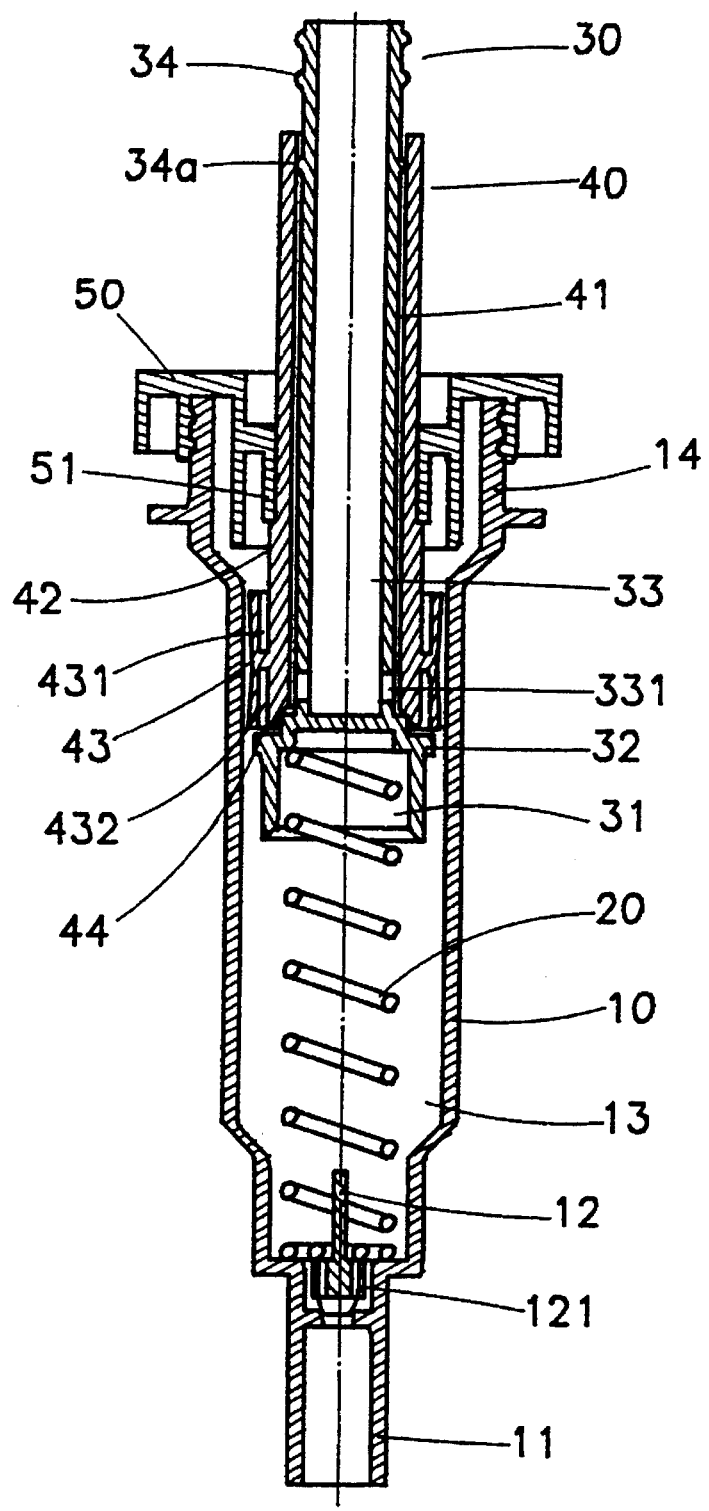
FIG. 2 is a longitudinal view in section of a cream dispenser head according to the present invention.

Referring to FIG. 2, a dispenser head for a cream dispenser in accordance with the present invention is generally comprised of a shell 10, a spring 20, a piston 30, a sleeve 40, and a cap 50. The shell 10 includes an inner surface defining an accumulator chamber 13, a dip tube 11 at the bottom end of the accumulator chamber 13, a valve 12 with a plurality of passage holes 121 formed between the accumulator chamber 13 and the dip tube 11. The piston 30, inserted through the sleeve 40, is comprised of a tubular piston body 33 and a spring holder 31 fixedly connected to one end of the tubular piston body 33. The spring 20 is received in the accumulator chamber 13 and stopped between the valve 12 and the spring holder 31 of the piston 30. The cap 50 is fastened to the top end 14 of the shell 10 to hold the sleeve 40 and the piston 30 in the accumulator chamber 13. A passage 41 is defined between the outer surface of the piston 30 and the inner surface of the sleeve 40. Through the passage 41, the cream is driven out of the cream dispenser head. The spring holder 31 is disposed inside the accumulator chamber 13 and stopped against one end of the spring 20, having a plurality of projecting portions 32 stopped against the inside wall of the shell 10 to stabilize the movement of the piston 30. The tubular piston body 33 has a radial through hole 331 at one end, adjacent to the spring holder 31, two mounting flanges 34 at an opposite end for coupling a saddle head (not shown), and raised portions 34a stopped against the inside wall of the sleeve 40 to stabilize the movement of the piston 30 in the sleeve 40. The sleeve 40 has an outward annular flange 42 in the middle, which is stopped at one end of the center tube 51 of the cap 50 when the piston 30 is not depressed, and an outside flange 43 around the periphery at one end defining an upper annular groove 431 and a lower annular groove 432. A gap 44 is defined between the outside flange 43 and the spring holder 31.

Figure 3:
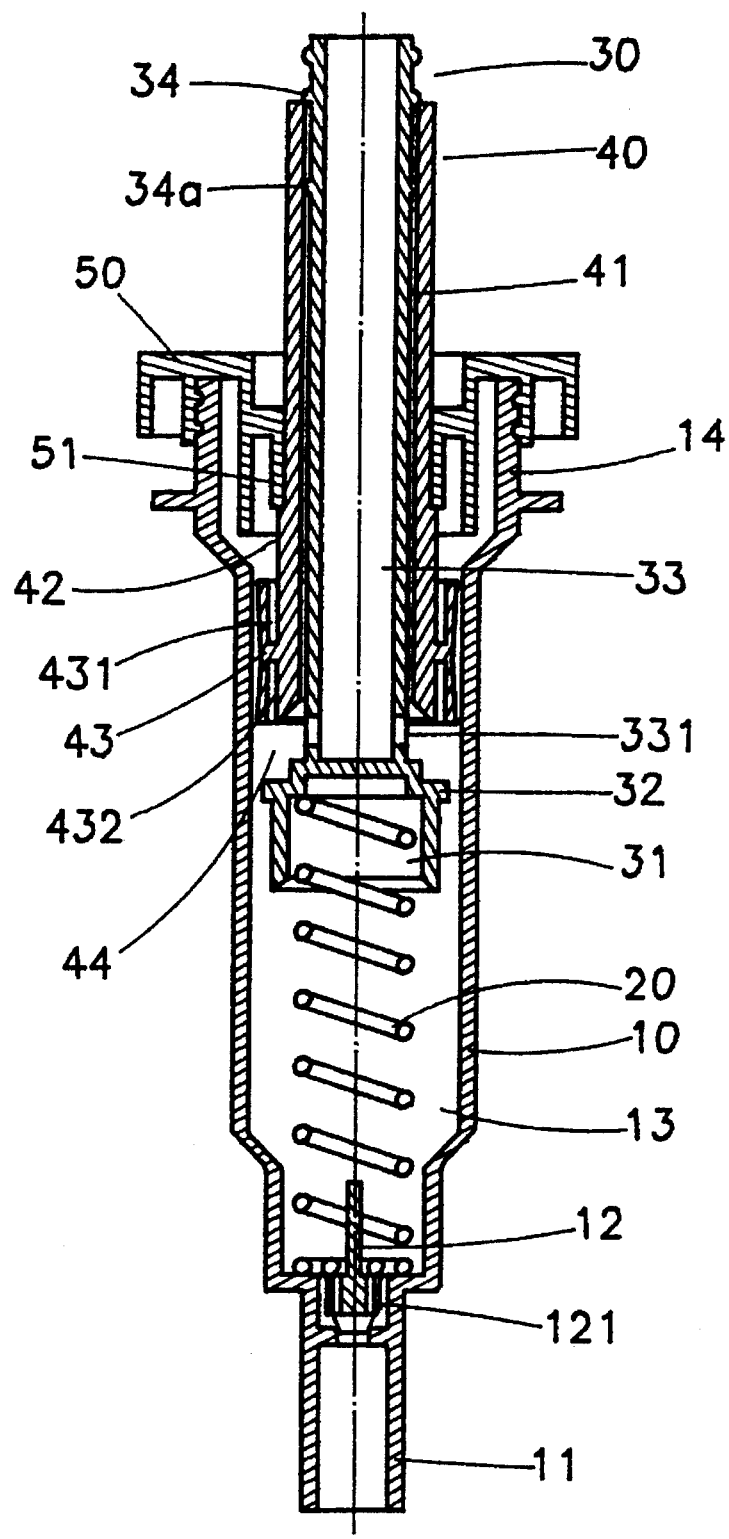
FIG. 3 is similar to FIG. 2, but showing the radial through hole on the piston opened.
Figure 4:
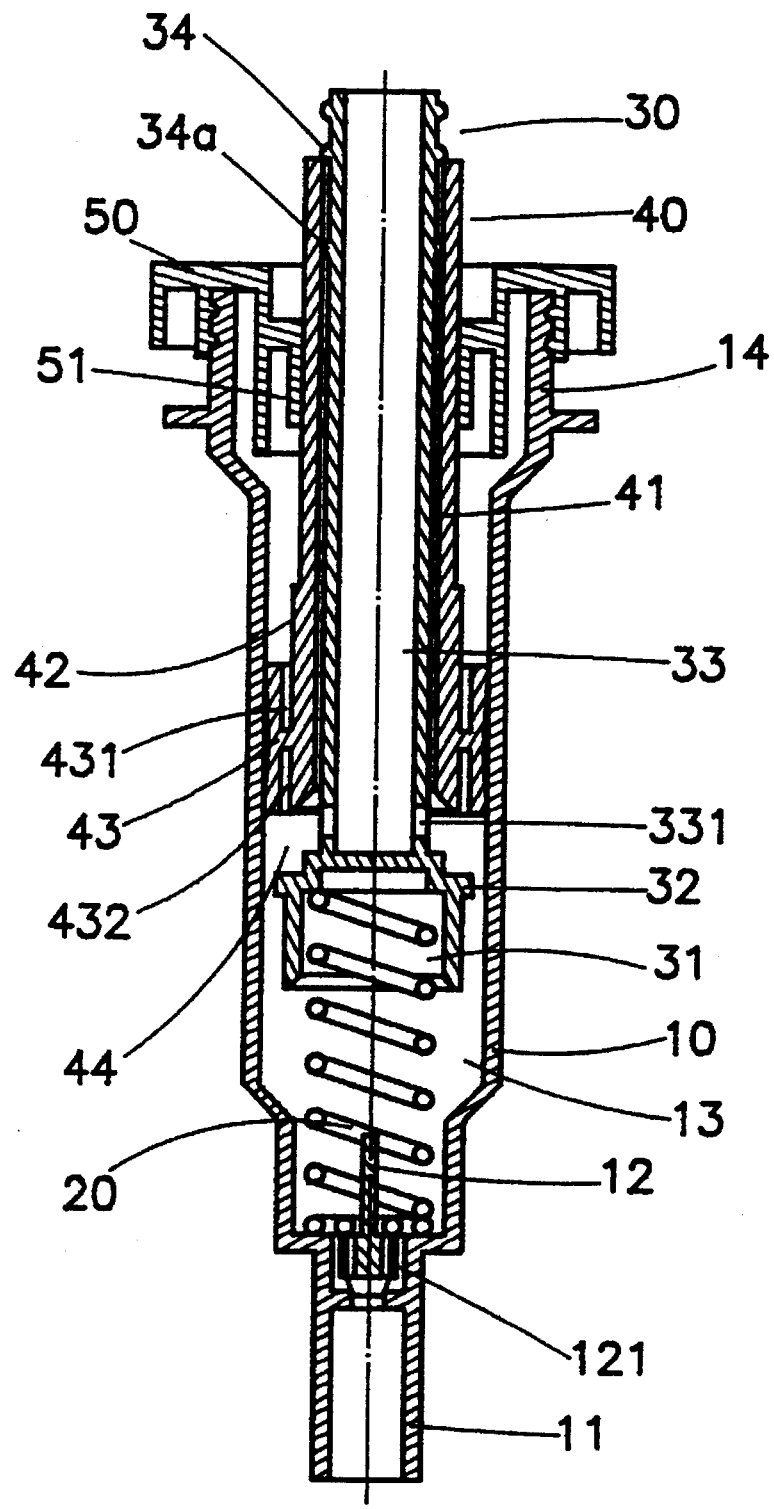
FIG. 4 shows the down stroke of the piston according to the present invention.
Figure 5:
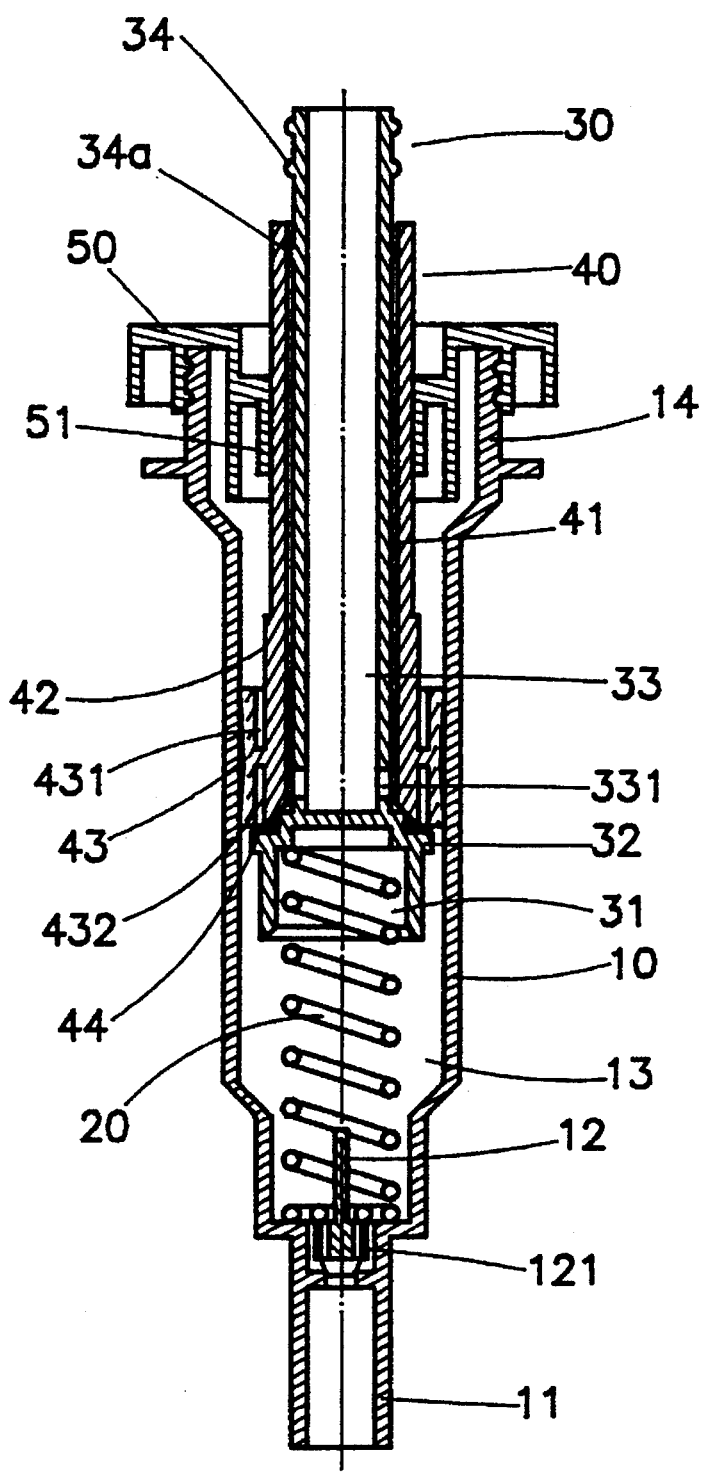
FIG. 5 shows the return stroke of the piston according to the present invention.

Referring to FIGS. 3, 4, and 5, when the piston 30 is depressed, the cream is pumped to flow from the accumulator chamber 13, through the gap 44, through the radial through hole 331 on the tubular piston body 33, and out of the cream dispenser head through the tubular piston body 33 of the piston 30. When the piston 30 is released, a vacuum is formed in the accumulator chamber 13 to suck the cream from the bottle (which is connected to the cream dispenser head) through the dip tube 11.

It is to be understood that the drawings are designed for purposes of illustration only, and are not intended as a definition of the limits and scope of the invention disclosed.

What is claimed is:

1. A dispensing head for a cream dispenser, comprising:

a cap having a center tube, said center tube having a longitudinally extended through bore;

a shell having a cylindrical wall forming a longitudinally extended cavity defining an accumulator chamber, said shell having a bottom end and open top end coupled to said cap;

a one piece sleeve having opposing first and second ends and a through passage extending longitudinally between said first and second ends, said first end being slidingly displaceably engaged within said through bore of said center tube, said sleeve having an outwardly extending annular flange between said first and second ends, said outwardly extending annular flange having a predetermined diameter greater than a diameter of said center tube whereby said outwardly extending annular flange acts as a stop against said center tube, said second end of said sleeve having an outside flange integrally formed therein, said outside annular flange being formed with an upper annular groove and a lower annular groove, said outside flange sealingly engaging an inner surface of said cylindrical wall of said shell;

a piston formed by a cylindrical wall having first and second longitudinally displaced ends and having a longitudinal bore extending from said piston first end for expelling a cream therefrom, said piston being slidingly displaceably disposed within said through passage of said sleeve, said cylindrical wall of said piston having an outer surface with a raised portion sealingly engaging an inner surface of said sleeve through passage, said piston second end having a spring holder integrally formed thereon, said piston having at least one through-hole located adjacent said second end in open communication with said longitudinal bore of said piston, said outer surface of said piston cylindrical wall having projecting portions extending therefrom intermediate said second end thereof and said through-hole for forming a stop against said sleeve second end, whereby displacement of said piston from a first position to a second position relative to said sleeve exposes said through-hole to a cream contained within said accumulator chamber, and concurrent displacement from said second position of said piston and said sleeve relative to said center tube to a third position compresses and forcibly displaces the cream through said through-hole, and through said piston bore;

a valve disposed within an opening formed in said bottom end of said shell;

a dip tube extending longitudinally from said bottom end of said shell; and, a spring disposed between said spring holder and said bottom end of said shell for applying a biasing force to said piston and said sleeve for displacement thereof from said accumulator chamber and thereby creating a vacuum in said accumulator chamber to draw more cream into said accumulator through said dip tube and said valve.

* * * * *